(12) United States Patent
Ackerman et al.

(10) Patent No.: US 7,086,803 B2
(45) Date of Patent: Aug. 8, 2006

(54) THIMBLE

(75) Inventors: David Ackerman, Dorchester (GB); Ian Mays, Faringdon (GB); Stephen Mark Trafford, Lyme Regis (GB)

(73) Assignee: Amsafe Bridport Limited, Dorset (GB)

( * ) Notice: Subject to any disclaimer, the term of this patent is extended or adjusted under 35 U.S.C. 154(b) by 0 days.

(21) Appl. No.: 11/057,269

(22) Filed: Feb. 11, 2005

(65) Prior Publication Data

US 2005/0141663 A1 Jun. 30, 2005

Related U.S. Application Data

(63) Continuation of application No. PCT/GB03/03597, filed on Aug. 5, 2003.

(30) Foreign Application Priority Data

Aug. 27, 2002 (GB) .................... 0219908

(51) Int. Cl.
 *F16G 11/00* (2006.01)
 *A44B 1/04* (2006.01)
 *B66C 1/12* (2006.01)

(52) U.S. Cl. ................... 403/210; 403/209; 24/129 R; 294/74

(58) Field of Classification Search ............... 403/209, 403/210, 214, 216; 24/129 B, 129 R; 59/78, 59/93; 174/141 R, 184, 207, 208; 294/74, 294/82.1, 82.11, 82.12

See application file for complete search history.

(56) References Cited

U.S. PATENT DOCUMENTS

| 2,003,225 | A |   | 5/1935  | Vrooman |        |
|-----------|---|---|---------|---------|--------|
| 2,445,798 | A |   | 7/1948  | Moore   |        |
| 2,647,943 | A |   | 8/1953  | Kreisler |       |
| 3,224,185 | A |   | 12/1965 | Grim    |        |
| 3,376,034 | A |   | 4/1968  | Ondrejka |       |
| 4,025,100 | A | * | 5/1977  | Bridgehouse | 294/74 |
| 4,645,598 | A | * | 2/1987  | Hannum  |        |
| 5,785,146 | A | * | 7/1998  | Palmer  | 294/74 |
| 5,950,284 | A | * | 9/1999  | Persson | 24/129 R |

FOREIGN PATENT DOCUMENTS

| CH | 271 205    | 10/1950 |
|----|------------|---------|
| FR | 2 260 647  | 9/1975  |
| WO | WO 01 42682 | 6/2001 |

* cited by examiner

Primary Examiner—Daniel P. Stodola
Assistant Examiner—Victor MacArthur
(74) Attorney, Agent, or Firm—Sturm & Fix LLP

(57) ABSTRACT

A thimble providing a first convex surface about a first axis and a second convex surface about a second axis, the first and second axes being substantially perpendicular to each other and the first and second surfaces being opposite each other, the thimble being such that a first length of elongate material can be wrapped over said first convex surface and back on itself to form a first loop around the thimble and a second length of elongate material can then be wrapped over said second convex surface through said first loop and back on itself to form a second loop around the thimble.

17 Claims, 3 Drawing Sheets

THIMBLE

CROSS REFERENCE TO RELATED APPLICATIONS

This application is a Continuation of PCT Application No. PCT/GB03/03597 filed Aug. 5, 2003, claiming priority of UK Application No. 0219908.1 filed Aug. 27, 2002, which is included in its entirety by reference made hereto.

BACKGROUND OF THE INVENTION

1. Field of the Invention

The present invention relates to a thimble for coupling a first length of elongate material to a second length of elongate material.

2. Description of Related Art

In situations where it is necessary to couple two lengths of material together it is common for the point at which they meet to become a point of weakness. This is due to a number of reasons, for example friction between the materials and the shallow radius of the materials at the point where they interface. This can limit the strength of the interface.

Thimbles are known devices commonly used in the rigging of boats as a means for forming an eye in a length of rope or other material. A basic thimble can be in the form of a ring of metal, having a concave outer surface around which a rope is spliced. This provides an eye in the rope which is durable and reduces wear on the rope.

BRIEF SUMMARY OF THE INVENTION

According to the present invention there is provided a thimble providing a first convex surface about a first axis and a second convex surface about a second axis, the first and second axes being substantially perpendicular to each other and the first and second surfaces being opposite each other, the thimble being such that a first length of elongate material can be wrapped over said first convex surface and back on itself to form a first loop around the thimble and a second length of elongate material can then be wrapped over said second convex surface through said first loop and back on itself to form a second loop around the thimble.

Preferably, each of the edges of the first and second surfaces has a flange extending along at least a portion of its length and more preferably the end portions of each of the first and second surfaces provide the flanges for the opposite one of the first and second surfaces.

It is preferred that a passageway extends through the thimble, from a first region on one of the first and second surfaces to a second, opposite region on that surface, such that a securing tie may pass through the passageway and across the other one of the first and second surfaces for securing a length of elongate material to said other one of the surfaces.

Even more preferably a further passageway extends through the thimble from a first region on the other one of said first and second surfaces to a second, opposite region on that surface, such that a securing tie may pass through the passageway and across said one of the first and second surfaces for securing a length of elongate material to said one of the surfaces.

When the thimble has at least one passageway and each of the edges of the first and second surfaces has a flange it is preferred that the or each passageway is associated at each end with a notch in the flange of the opposite one of the surfaces for receiving such a tie.

The thimble may be made of a rigid plastics material or, alternatively it may be made of a light weight metal such as aluminium.

The thimble is preferably made from a fire retardant material and is preferably of a one piece construction.

The thimble is preferably used to couple a first length of elongate material to a second length of elongate material and more preferably the first and second lengths comprise lengths of polyester webbing. Advantageously, the two lengths of elongate material may be in or for a cargo barrier net and the cargo barrier net may be located in the fuselage of an aircraft.

BRIEF DESCRIPTION OF THE DRAWINGS

For a better understanding of the present invention reference will now be made to the accompanying drawings showing, solely by way of example, an embodiment of the invention and, in which.

DETAILED DESCRIPTION OF THE INVENTION

Figure 1:
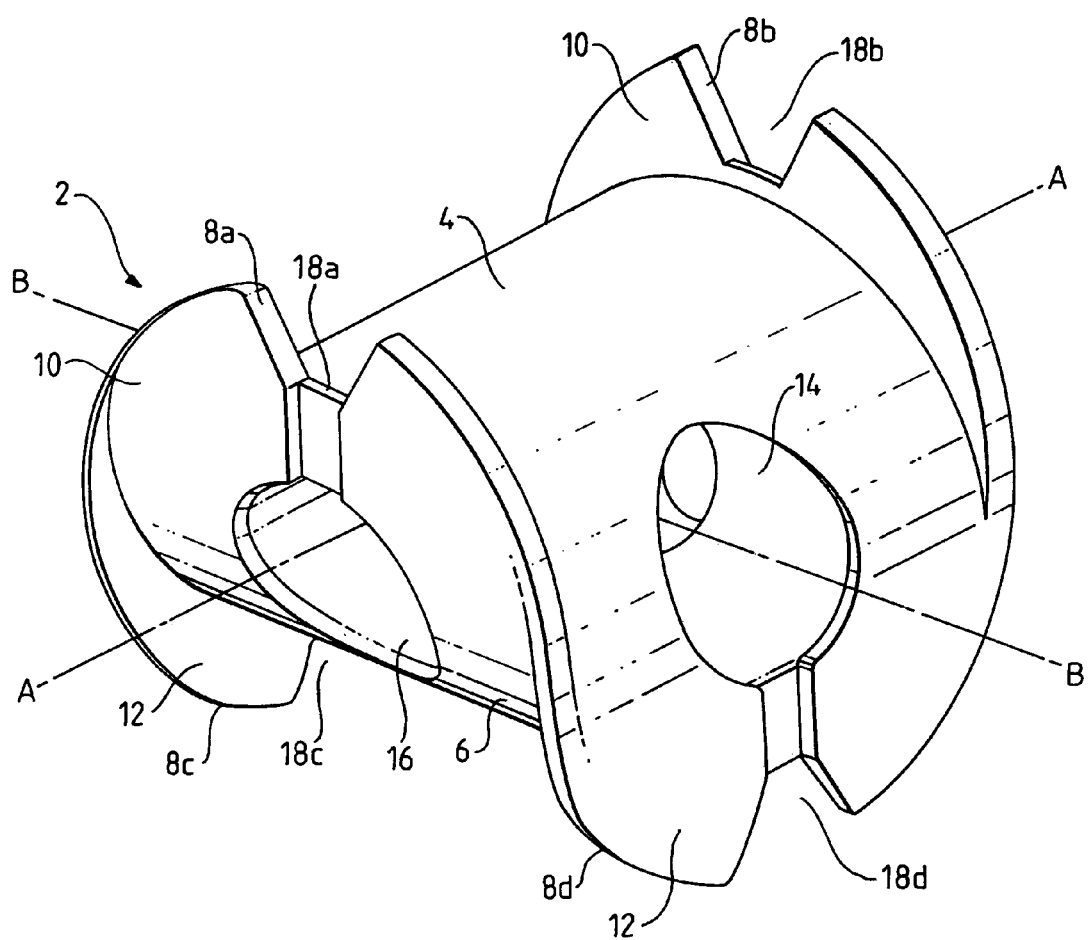
FIG. 1 is a perspective view of a thimble.

Referring now to FIG. 1, this shows a thimble 2 for connecting two lengths of elongate material. The thimble 2 is a one piece construction formed from a rigid plastics material. The thimble 2 may suitably be constructed from a metal such as aluminium which has the added benefit of being fire retardant as well a relatively light weight.

Figure 2:
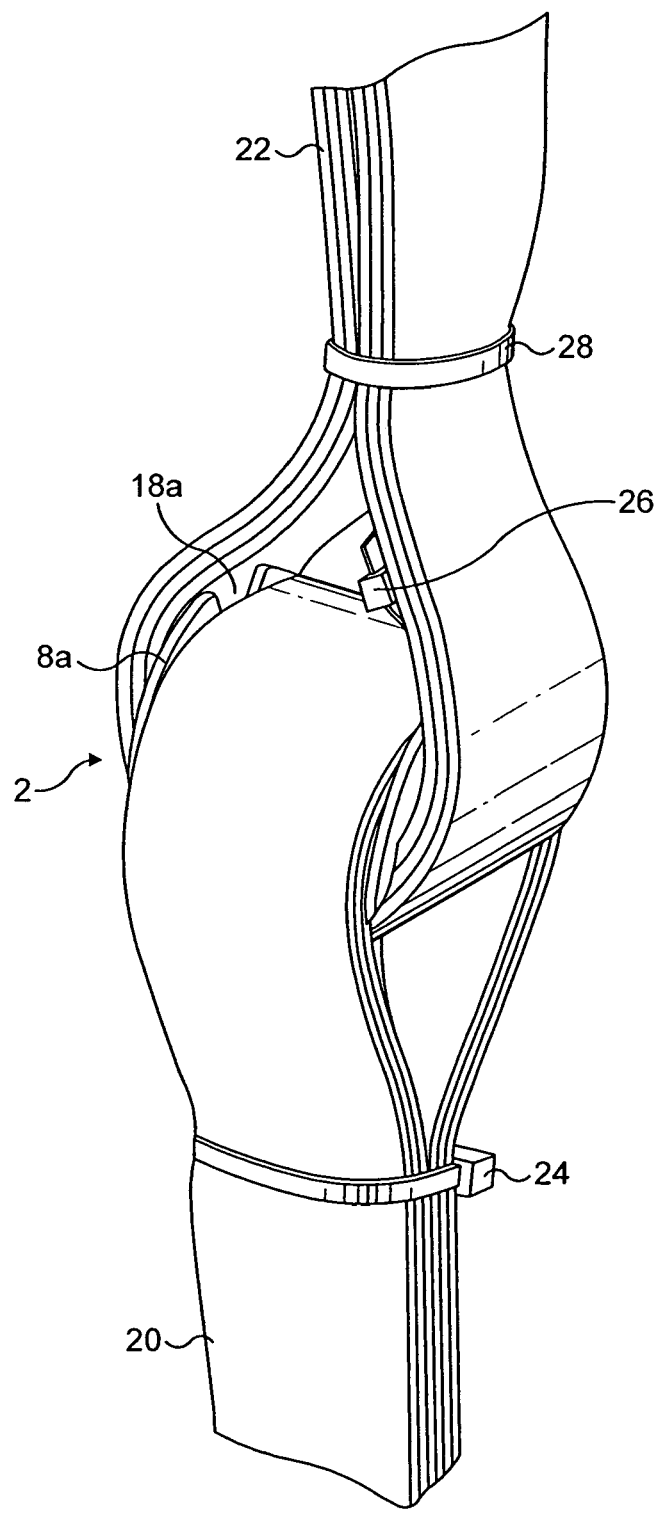
FIG. 2 is a perspective view of a thimble coupling two lengths of elongate material.
Figure 3:
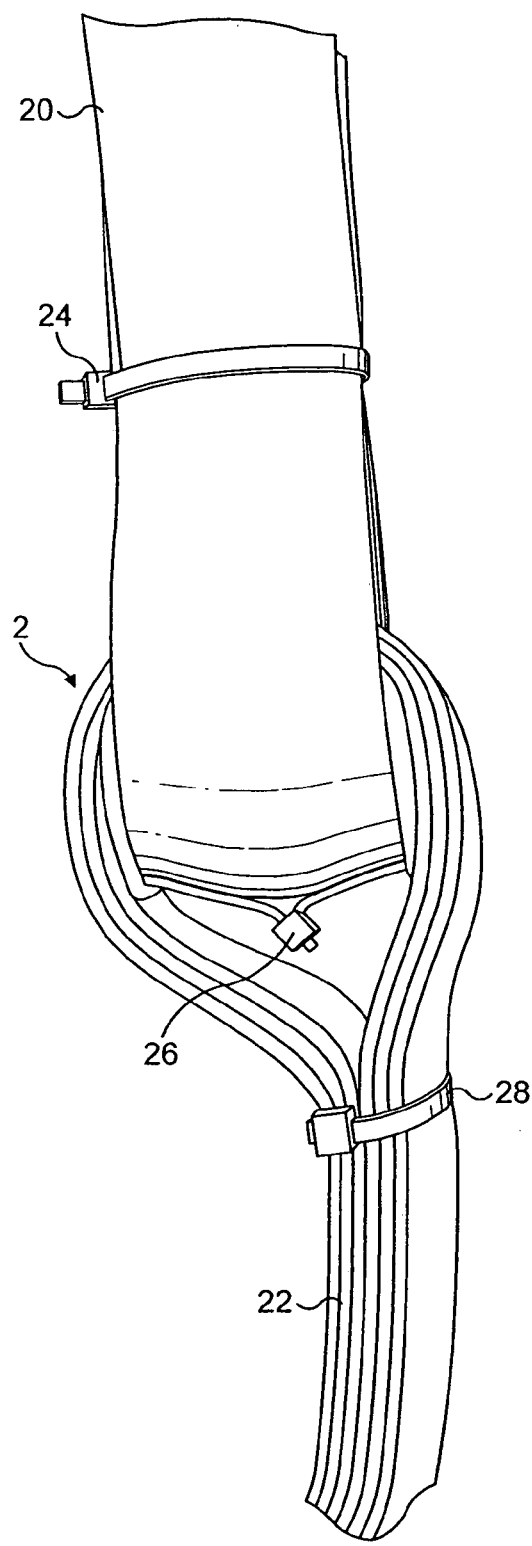
FIG. 3 is another view of the thimble of FIG. 2.

The thimble 2 has two surfaces 4, 6 which are opposite each other and, in use, each one supports one of the lengths of elongate material (See FIGS. 2 and 3). The first surface 4 is convex about a first axis A—A and the second surface 6 is convex about a second axis B—B, which is perpendicular to the first axis. Although the thimble 2 shown in FIG. 1 is of a unitary construction it is possible that the two surfaces 4, 6 could be separate parts connected together.

The first surface 4 has a cylindrical passageway 14 extending from a first point on the surface 4 to a second point on the surface 4 through the centre of the thimble 2 along axis B—B. The second surface 6 has a cylindrical passageway 16 extending from a first point on the second surface 6 to a second point on the surface 6 through the centre of the thimble 2 along axis A—A. The two passageways 14, 16 are perpendicular to each other and intersect at the centre of the thimble 2. The diameter of the passageways 14, 16 is dependant on the required strength in compression of the thimble 2. In order to make the thimble 2 as light as possible the diameter of the passageways 14, 16 should be as large as structurally possible.

The first surface 4 has flanges 8a and 8b on each side extending along a portion of its length, each flange 8a, 8b being symmetrical about the midpoint of the surface 4. The flanges 8a, 8b prevent the length of elongate material from slipping whilst in use and are formed by the end portions 10 of the second surface 6 which extend above the plane of the first surface 4. The second surface 6 has flanges 8c and 8d on each side extending along a portion of its length. As with the first pair of flanges 8a, 8b, the flanges 8c, 8d on the second surface 6 are formed by the end portions 12 of the first surface 4 which extend above the plane of the second surface 6.

Each flange 8a, 8b, 8c, 8d has a corresponding notch 18a, 18b, 18c, 18d in the form of a truncated V shaped cut-away portion at its midpoint. The notches on flanges 8a and 8b are aligned such that, in use, they may retain a plastic tie (not shown) which is used to secure the first length of elongate material to the first surface 4. The tie passes through the second passageway 16, through each of the notches 18a, 18b and across the first surface 4 to secure the first elongate length of material to the surface 4 (See FIG. 2). The notches on flanges 8c and 8d perform the same function for the second surface 6.

Referring now to FIGS. 2 and 3, these show the thimble 2 of FIG. 1 coupling a first length 20 of elongate material to a second length 22 of elongate material. The first length 20 was wrapped over the first surface 4 and back on itself to form a first loop. A plastic 24 tie secures the two portions of the first length 20. Other means of securing the two ends may be used, for example stitching. A further plastic tie 26 passes through the passageway 16 and the notches 18a and 18b and secures the first length 20 to the thimble 2. The flanges 8a, 8b on the first surface 4 help to prevent the first length 20 from slipping. The second length 22 was then wrapped over the second surface 6, through the first loop, and back on itself to form a second loop. As before the two portions of the second length 22 are secured by way of a plastic tie 28 and the second length 22 is further secured to the thimble 2 by means of a further tie (not shown) which passes through the passageway 14, through the notches 18c, 18d and secures the second length 22 to the thimble 2.

The two lengths 20, 22 of elongate material are now securely coupled. In this configuration the lengths 20, 22 are orientated at 90° to each other. Using a thimble 2 as described it is possible to couple two lengths of material together without a substantial loss in strength as compared to one single length. A thimble 2 such as this would be particularly suitable for coupling two lengths of net material in a cargo barrier net, for example at the point where the main section of the net is attached to various webbing loops, which in turn are attached to the fuselage of an aircraft via an attachment fitting.

The invention claimed is:

1. A thimble comprising a first convex surface about a first axis and a second convex surface about a second axis, the first and second axes being substantially perpendicular to each other and the first and second surfaces being opposite each other, the thimble being such that a first length of elongate material can be wrapped over said first convex surface and back on itself to form a first loop around the thimble and a second length of elongate material can then be wrapped over said second convex surface through said first loop and back on itself to form a second loop around the thimble, wherein a passageway extends through the thimble, from a first region on one of the first and second surfaces to a second, opposite region on that surface, such that a securing tie may pass through the passageway and across the other one of the first and second surfaces for securing a length of elongate material to said other one of the surfaces.

2. A thimble according to claim 1, wherein the first and second surfaces have edges and each of the edges has a flange extending along at least a portion of its length.

3. A thimble according to claim 2, wherein the first and second surfaces have end portions and the end portions of each of the first and second surfaces provide the flanges for the opposite one of the first and second surfaces.

4. A thimble according to claim 1, wherein a further passageway extends through the thimble from a first region on the other one of said first and second surfaces to a second, opposite region on that surface, such that a securing tie may pass through the passageway and across said one of the first and second surfaces for securing a length of elongate material to said one of the surfaces.

5. A thimble according to claim 4, wherein the first and second surfaces have edges and each of the edges of the first and second surfaces has a flange extending along at least a portion of its length and wherein the further passageway is associated at each end with a notch in the flange of the opposite one of the surfaces for receiving such a tie.

6. A thimble according to claim 5, wherein the first and second surfaces have end portions and the end portions of each of the first and second surfaces provide the flanges for the opposite one of the first and second surfaces.

7. A thimble according to claim 1, wherein the first and second surfaces have edges and each of the edges of the first and second surfaces has a flange extending along at least a portion of its length and wherein the passageway is associated at each end with a notch in the flange of the opposite one of the surfaces for receiving such a tie.

8. A thimble according to claim 6, wherein the first and second surfaces have end portions and the end portions of each of the first and second surfaces provide the flanges for the opposite one of the first and second surfaces.

9. A thimble according to claim 1, wherein the thimble is made of a rigid plastics material.

10. A thimble according to claim 1, wherein the thimble is made of aluminium.

11. A thimble according to claim 1, wherein the thimble is made of a fire retardant material.

12. A thimble according to claim 1, wherein the thimble is of a one piece construction.

13. A thimble according to claim 1, wherein the thimble is constructed from at last two pieces.

14. A thimble according to claim 1, wherein a first length of elongate material is wrapped over said first surface and a second length of elongate material is wrapped over said second surface such that the two lengths are coupled together.

15. A thimble according to claim 14, wherein the first and second lengths comprise lengths of polyester webbing.

16. A thimble according to claim 14, wherein the two lengths of elongate material are in a cargo barrier net.

17. A thimble according to claim 16 wherein the cargo barrier net is located in the fuselage of an aircraft.

* * * * *